No. 744,774. PATENTED NOV. 24, 1903.
H. H. LYON.
ROTARY VEGETABLE GRATER.
APPLICATION FILED AUG. 18, 1903.
NO MODEL. 2 SHEETS—SHEET 1.
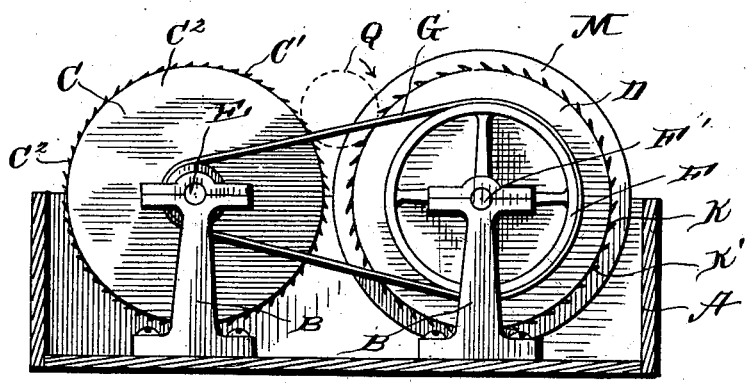
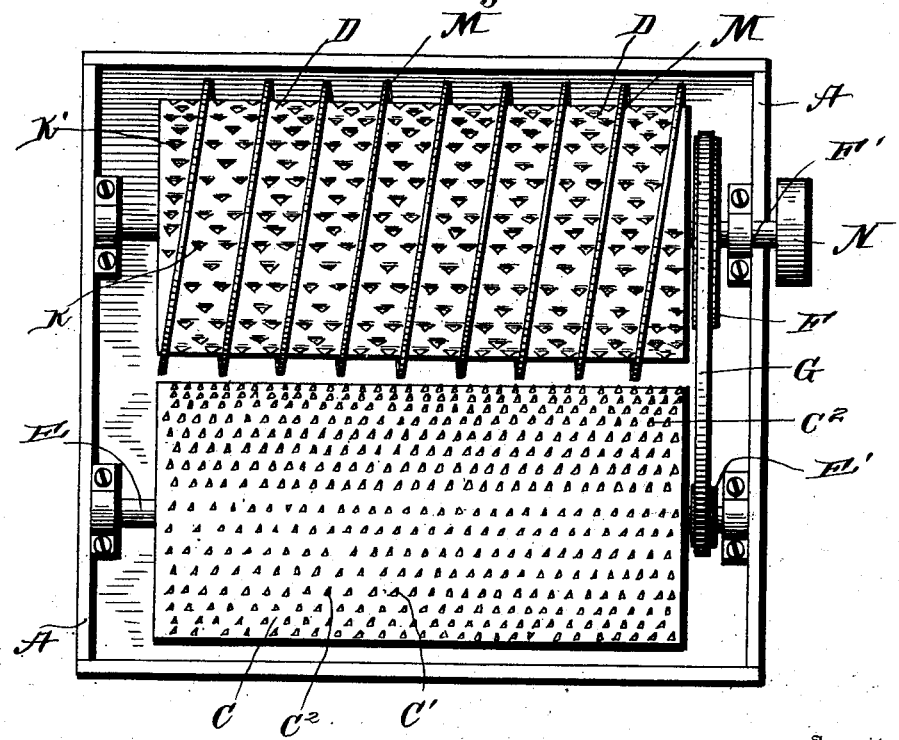
Witnesses
R. A. Boswell
A. L. Hough
Inventor
Henry H. Lyon
By Franklin N. Hough
Attorney
THE NORRIS PETERS CO., PHOTO-LITHO., WASHINGTON, D. C.

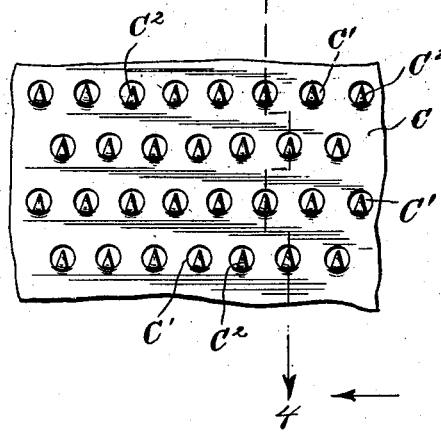
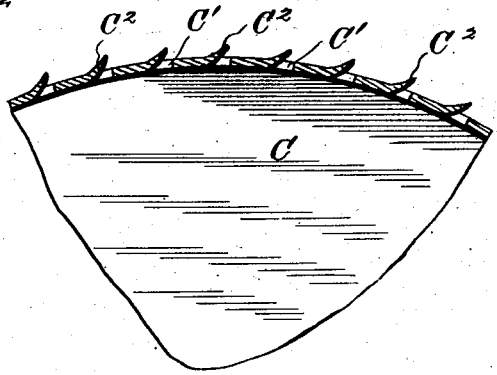
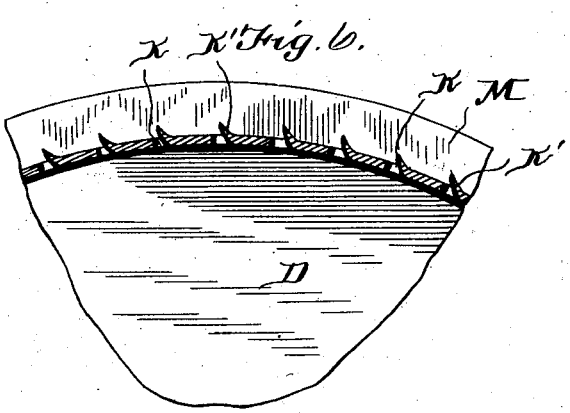
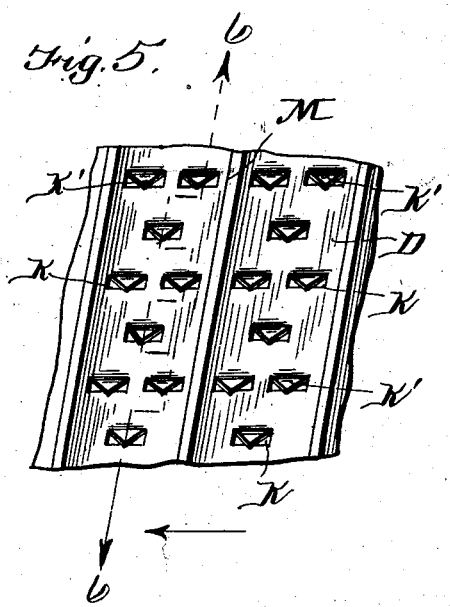

No. 744,774. Patented November 24, 1903.

UNITED STATES PATENT OFFICE.

HENRY H. LYON, OF RIVERSIDE, CALIFORNIA.

ROTARY VEGETABLE-GRATER.

SPECIFICATION forming part of Letters Patent No. 744,774, dated November 24, 1903.

Application filed August 18, 1903. Serial No. 169,896. (No model.)

*To all whom it may concern:*

Be it known that I, HENRY H. LYON, a citizen of the United States, residing at Riverside, in the county of Riverside and State of California, have invented certain new and useful Improvements in Rotary Vegetable-Graters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in rotary cutters for grinding or grating fruits of various kinds; and it consists in the provision of two cylinders which are adapted to rotate at different speeds and provided with means for causing the fruit to rotate at the speed of one of the cylinders and to be fed longitudinally of the cylinders during the grating of the fruit, thereby thoroughly grating the fruit, and by the combined influence of the two movements a new surface of the fruit is continuously presented to the action of the cutting or grating surface upon one of the cylinders until the fruit is finally discharged at the ends of the cylinders.

The invention consists, further, in various details of construction and combinations and arrangements of parts, which will be hereinafter fully described and then specifically defined in the appended claims.

My invention is illustrated in the accompanying drawings, which, with the letters of reference marked thereon, form a part of this application, and in which drawings similar letters of reference indicate like parts throughout the various views, in which—

Figure 1 is an end view showing my improved rotary grating apparatus. Fig. 2 is a top plan view. Fig. 3 is an enlarged detail view of the surface of one of the cylinders. Fig. 4 is an enlarged sectional view showing a grating-surface on one cylinder. Fig. 5 is an enlarged detail view of the surface of the other cylinder, and Fig. 6 is a sectional view through Fig. 5.

Reference now being had to the details of the drawings by letter, A designates a box or receptacle from which rise standards B, in which the two cylinders C and D are mounted in suitable bearings, the former of which cylinders C has a circumference having perforations C' therein, which have outwardly-extending burs $C^2$ about their margins, as shown clearly in the sectional view, Fig. 4. Mounted upon the shaft E, which carries cylinder C, is a pulley E', which has belted connection with a pulley F, mounted upon the shaft F', on which the cylinder D is mounted. Said pulley F is of larger diameter than the pulley E, and a belt G passes about said pulleys and is adapted to impart an accelerated rotary movement to the cylinder C as the two rotate together. The circumference of the cylinder D has a series of elongated slots K therein, shown clearly in the detail view, the marginal edges of which slots have burs K', which are preferably set at an angle, as shown in the end elevation. Power is applied to the shaft F' through the medium of a pulley N, which may be belted to any source of supply.

A spiral M is provided about the circumference of the cylinder D for the purpose of feeding the fruit forward longitudinally along the cylinder as it is subjected in its rotary movement to the grating action of the surface of the cylinder C.

In operation the fruit (indicated by the dotted line Q in Fig. 1 of the drawings) is placed between and resting upon the surfaces of the two cylinders. As the pulleys E' and E are of different sizes, the speed of the two cylinders will be inversely proportionate to the diameters of said pulleys, and the fruit will be acted upon by the grating-surface of the cylinder C, which has the higher speed, but is prevented by the projections or burs K' on the other cylinder from turning faster than the circumferential speed of the cylinder D. Consequently a rotative movement in the direction of the arrow, as shown in Fig. 1 of the drawings, is given the fruit, and owing to the greater speed of the cutting-surface on the circumference of the cylinder C a narrow band around the surface of the fruit is grated off and falls into the cylinder C through the perforations C', and by the action of the spiral M, carried by the cylinder D, an additional rotative movement is imparted to the fruit which is at right angles to the plane of the rotative movement described, so that under the combined influence of the two movements a new surface of the fruit is continuously presented to the action of the grating-surface on the circumference of the cylinder C until it is finally discharged at the ends of the cylinders.

While I have shown a particular construction of apparatus embodying my fruit-grater, it will be understood that I may make alterations in the detailed construction of the same without departing from the spirit of the invention.

Having thus fully described my invention, what I claim as new, and desire to secure by Letters Patent, is—

1. A rotary fruit-grating apparatus comprising a receptacle, two cylinders mounted therein and mechanism for driving the same at different speeds, the surface of one cylinder having perforations, the upper marginal edges of which are outwardly turned to form a cutting or grating surface, the other cylinder provided with elongated slots in its circumference with outwardly-extending burs adapted to hold the fruit to rotate at the same rate of speed as the cylinder having the elongated slots to be acted upon by the grating-surface on the circumference of the other cylinder, and means for moving the fruit longitudinally along the cylinders, as set forth.

2. A grating apparatus comprising two rotary cylinders adjacent to each other and means for driving the same at different speeds, the circumferences of said cylinders being perforated, portions of the cylinders adjacent to said apertures being formed into burs to produce a grating-surface, and a spiral wing on the circumference of one of the cylinders for feeding the fruit along the cylinders as the fruit is being grated, as set forth.

3. A rotary grating apparatus comprising two cylinders, and means for driving the same at different speeds, the circumference of the faster-rotating cylinder having apertures portions of the marginal edges of which are outwardly turned to form burs, the other slower-moving cylinder having a circumference with elongated slots, portions of the marginal edges of which are formed into burs, a spiral feeding-wing mounted upon the circumference of the cylinder which rotates at a slower speed, the burs about the marginal apertures of the elongated slots designed to engage fruit and cause the same to turn at the same rate of speed as the cylinder having said elongated slots, whereby a continuous band is grated about the fruit by the rapidly-rotating cylinder as the fruit is advanced by the spiral feed, as set forth.

4. A grating apparatus comprising two rotary cylinders and means for driving the same, adapted to be rotated at different rates of speed, the cylinder having the higher speed being provided with a cutting or grating surface, the cylinder with the lower speed being provided with projections or burs adapted to engage the fruit and prevent it from turning faster than its own circumferential speed, a spiral feed-wing, mounted upon the circumference of the cylinder having the lower speed, and adapted to impart a motion to the fruit at right angles to the motion imparted by the cylinders, whereby under the influence of the two motions, a surface of the fruit is continuously presented to the grating action of the cylinder having the higher speed, as set forth.

In testimony whereof I hereunto affix my signature in presence of two witnesses.

HENRY H. LYON.

Witnesses:
F. E. DENSMORE,
CHRISTIE BARTEL.